(12) United States Patent
Randle

(10) Patent No.: US 8,991,865 B2
(45) Date of Patent: Mar. 31, 2015

(54) COLLAPSIBLE STEERING COLUMN

(71) Applicant: McLaren Automotive Limited, Surrey (GB)

(72) Inventor: Steven James Randle, Warwickshire (GB)

(73) Assignee: McLaren Automotive Limited, Woking, Surrey (GB)

( * ) Notice: Subject to any disclaimer, the term of this patent is extended or adjusted under 35 U.S.C. 154(b) by 210 days.

(21) Appl. No.: 13/629,384

(22) Filed: Sep. 27, 2012

(65) Prior Publication Data
US 2014/0083234 A1   Mar. 27, 2014

(51) Int. Cl.
*B62D 1/19*   (2006.01)

(52) U.S. Cl.
CPC ...................... *B62D 1/195* (2013.01)
USPC ............. 280/777; 280/779; 280/775; 74/493; 188/371

(58) Field of Classification Search
CPC ........... B62D 1/195; B62D 1/192; B62D 1/19
USPC .................... 280/777, 779, 775; 74/492, 493; 188/371
See application file for complete search history.

(56) References Cited

U.S. PATENT DOCUMENTS 3,769,851 A * 11/1973 Edme et al. ...................... 74/492
4,786,076 A * 11/1988 Wierschem ................... 280/777
5,470,107 A * 11/1995 Muntener et al. ............. 280/777
6,595,079 B2 * 7/2003 Duffy ............................... 74/492
7,125,047 B2 * 10/2006 Lee ................................ 280/777
7,661,711 B2 * 2/2010 Menjak et al. ................. 280/777
8,534,705 B2 * 9/2013 Fujiwara et al. .............. 280/777

FOREIGN PATENT DOCUMENTS

| DE | 3521644 C1 * | 12/1986 | ............... B62D 1/18 |
| EP | 0479455 A2 | 4/1992 | |
| EP | 1916175 A2 * | 4/2008 | ............... B62D 1/19 |
| EP | 1967442 A2 | 9/2008 | |
| EP | 2377743 A2 | 10/2011 | |
| GB | 2411156 A * | 8/2005 | ............... B62D 1/19 |

* cited by examiner

*Primary Examiner* — Keith Frisby
(74) *Attorney, Agent, or Firm* — James F. Hann; Haynes Beffel & Wolfeld LLP

(57) ABSTRACT

A collapsible steering column assembly comprising a mounting structure, the mounting structure comprising a first part for connecting to the body of a vehicle and a second part for connecting to part of a steering mechanism, the first and second parts being interconnected to permit relative movement therebetween as the assembly collapses, wherein: one of the first or second parts comprises a slot, the slot comprising a pocket and a channel defined by two opposing sidewalls, each sidewall being the outer edge of a deformable structure; the other of the first or second parts comprises a lug, the lug extending into the pocket when the assembly is in a non-collapsed state and being configured to be driven through the channel to cause plastic deformation of the deformable structure as the assembly collapses; and the assembly comprises a re-enforcement that limits the plastic deformation of the deformable structure during the collapsing stroke to regions of the deformable structure adjacent to regions of the channel through which the lug has passed.

9 Claims, 5 Drawing Sheets

--Prior Art--

--Prior Art--

--Prior Art--

COLLAPSIBLE STEERING COLUMN

FIELD OF THE DISCLOSURE

This invention relates to a collapsible steering column assembly.

BACKGROUND

Many vehicles are provided with a steering control such as a wheel or yoke which allows the driver to control the vehicle's direction. Taking a conventional automobile as an example, it is typically equipped with a steering wheel which is located in front of the driver. A control linkage extends forwards from the steering wheel to a mechanism such as a steering rack that converts rotation of the steering wheel to an appropriate motion of the automobile's steering wheels. The control linkage, together possibly with any cosmetic or support structures associated with it is known as a steering column. In addition to automobiles, similar structures exist in other vehicles, such as trucks, motor boats and aircraft.

The steering column typically extends away from the driver's position, most normally forward of the driver. If the vehicle is involved in a collision the driver's body might hit the steering column. It is therefore desirable for the steering column to be able to deform, particularly by collapsing in the direction along its axis, so as to absorb energy and reduce injury to the driver.

Several techniques are known for absorbing kinetic energy in a steering column. In one class of techniques a shaft of the steering column is capable of telescoping axially, a first part of the column being in the form of a tube into which a second part of the column can slide. Relative motion of the first part relative to the second part is resisted by means of a frictional clamping arrangement. When the column is subjected to an axial compression force that is high enough to overcome the friction of the clamp the two parts can collapse telescopically. One problem with this arrangement is that it is difficult to design the clamp so that energy is absorbed evenly as the column collapses. Once the frictional force of the clamp has been overcome the collapse of the steering column assembly can sometimes occur with minimal resistive force.

In a typical implementation of a steering column assembly in a vehicle, the assembly is secured to a support structure by means of a support bracket. The support structure may form part of the vehicle chassis or be some other structural component of the vehicle. In another class of energy absorption techniques energy is absorbed due to work done in the plastic deformation of the support bracket, or of other intermediary structures linking the steering column to the structure of the vehicle.

EP 0,479,455 B1 (Melotik) is an example of such a steering column assembly. In Melotik a support bracket connects a steering column assembly to a support structure. FIG. 1 is a diagram of the support bracket. The right-hand portion of FIG. 1 shows the bracket in its-non-collapsed state (i.e. before a substantial impact) and the left-hand portion of FIG. 1 shows it in its collapsed state. The support bracket is broadly U-shaped in plan-view, and contains a base portion 54 and two side members 56 and 58. The support bracket is designed to fit around the steering column such that the side members 56 and 58 are located on respective sides of the steering column. The base portion contains a bore 62 through which a steering shaft passes. Each side member contains a guide slot 92 which has at its rearward end a pocket 94. When the assembly is in a non-collapsed state (on the right-hand side of FIG. 1) a bolt 70, which connects the support bracket to the structure of the vehicle, sits in the pocket 94. Forward of the pocket the guide slot diminishes in width to be narrower than the diameter of the bolt 70. The guide slot divides the side member into a guide rail 96 and a deformable rail 98. The guide rail is thicker than the deformable rail.

When a significant impact occurs, the bolt 70 is driven forwards from its initial position in pocket 70. As the bolt moves through the guide slot 92 the energy absorbing side rail undergoes plastic deformation. Once the bolt reaches the end position, as illustrated on the left-hand side of FIG. 1, the guide slot will have been deformed to a slot of uniform width. Energy is absorbed by the support bracket as the deformable rails are pushed sideways. Although in theory it might be possible to design the deformable rails so that energy can be absorbed uniformly along the travel of the bolt, in practice this would be expected to be difficult. The reason for this is that when the bolt is part way through its travel parts of the deformable rails will already have moved sideways, and that movement will significantly affect the force needed to advance the bolt further into the slot.

EP 2,377,743 (Olgren) discloses a further method of absorbing the kinetic energy of an impact onto the steering column by means of plastic deformation. The steering assembly of Olgren comprises a steering shaft housed in a jacket. A support bracket attaches the assembly to the vehicle. FIG. 2a is a diagram of the support bracket 30. The bracket contains a substantially horizontal base plate 54 and two vertical panels 56 and 58 which project downwards from the base plate. Each vertical panel contains a first slot 60, the slot extending horizontally.

In one structure disclosed by Olgren a carriage is attached rigidly to the jacket of the steering shaft, the carriage being supported by the bracket 30. FIG. 2b is a diagram of the carriage 32. The carriage is generally U-shaped when viewed in cross-section and contains two vertical walls 64 and 66. Each vertical wall contains a guide slot 68 which has at its one end a hole 100. The width of the guide slot is uniform along its length and less than the diameter of the hole 100. A bolt is used to assemble the carriage to the bracket 32. When the carriage is assembled to the bracket 32 and the steering column assembly is in a non-collapsed state the bolt is threaded through the holes 100 of the carriage and slots 60 of the support bracket 30. The diameter of the bolt is greater than the width of the guide slot 68. During the collapse of the assembly the bolt travels from the hole 100 through the guide slot 68 to an end position 106. Because the diameter of the bolt is greater than the width of the guide slot, the bolt causes the vertical walls 64 and 66 to plastically deform. The work done in plastically deforming the vertical walls absorbs a portion of the impact energy of the driver onto the steering column assembly.

In another structure disclosed by Olgren energy is absorbed through the plastic deformation of the support bracket itself. In this embodiment the slots of the support bracket are contoured in the same fashion as the guide slots 68 of the carriage in the first embodiment. FIG. 3 is a diagram of the support bracket according to the second embodiment. A bracket 230 comprises a substantially horizontal base plate and two vertical panels that extend vertically downwards from the base plate. Each panel has a guide slot 260, with a hole at its one end. The guide slots have uniform width which is less than the diameter of the hole. When the bracket is in its initial assembled position a bolt 280 threads both holes. The diameter of the bolt is greater than the width of the guide slots. In the event of a substantial impact the bolt is driven along the slot 260. Energy is absorbed by the plastic deformation of the bracket 230.

There is thus a need for an improved method of absorbing kinetic energy during the collapse of a steering column.

According to the present invention there is provided a collapsible steering column assembly comprising a mounting structure, the mounting structure comprising a first part for connecting to the body of a vehicle and a second part for connecting to part of a steering mechanism, the first and second parts being interconnected to permit relative movement therebetween as the assembly collapses, wherein: one of the first or second parts comprises a slot, the slot comprising a pocket and a channel defined by two opposing sidewalls, each sidewall being the outer edge of a deformable structure; the other of the first or second parts comprises a lug, the lug extending into the pocket when the assembly is in a non-collapsed state and being configured to be driven through the channel to cause plastic deformation of the deformable structure as the assembly collapses; and the assembly comprises a re-enforcement that limits the plastic deformation of the deformable structure during the collapsing stroke to regions of the deformable structure adjacent to regions of the channel through which the lug has passed.

Suitably the deformable structure comprises a relatively strong portion running longitudinally with the channel and a relatively weak portion running longitudinally with the channel and located between the relatively strong portion and the channel.

Suitably the relatively strong portion of the sidewall is thicker than the relatively weak portion of the sidewall when viewed in cross-section in a plane perpendicular to the longitudinal direction of the slot.

Alternatively the relatively weak portion could have a tapered profile when viewed in cross-section in a plane perpendicular to the longitudinal direction of the slot.

The relatively strong portion may have a higher material hardness than the relatively weak portion. The relatively strong portion may have a greater cross-sectional area than the relatively weak portion. The relatively strong portion could be configured with strengthening structures, such as ribs, which contribute to it being more resistant to deformation than the relatively weak portion. The relatively weak portion could be configured with zones of weakness, such as grooves, notches or perforations, which contribute to it being less resistant to deformation than the relatively strong portion.

Preferably the re-enforcement is the relatively strong portion.

Preferably the relatively strong portion is configured such that plastic deformation of the deformable structure is limited to the relatively weak portions.

Suitably the total width of the channel and the relatively weak portions is at least as great as the width of the lug.

BRIEF DESCRIPTION OF DRAWINGS

The present disclosure will now be described by way of example with reference to the following drawings. In the drawings:

FIG. 2b is a side view of a prior art carriage of an adjustable steering column assembly to be used in conjunction with the bracket of FIG. 2a.

DETAILED DESCRIPTION

The apparatus described below provides a means of permitting a steering column assembly to collapse, absorbing energy. In a preferred embodiment the steering column is mounted to a vehicle by means of a bracket that includes a slot. A relatively stiff lug is located in the slot. One of the bracket and the lug is connected to the body of the vehicle and the other is connected to the distal end of the steering column so that when the steering column collapses the lug moves in the slot. The width of the slot is smaller than the dimension of the lug that extends transversely to the slot. As a result the lug deforms the slot when it slides in the slot. The slot is defined by two opposing sidewalls. At least one of the sidewalls comprises a relatively strong portion running longitudinally with the slot and a relatively soft portion located between the relatively strong portion and the slot. The relatively soft portion defines one of the side walls of the slot. The relative strength of the strong and soft portions is selected such that when the lug ploughs through the slot, deformation of the said one of the sidewalls is restricted to the relatively soft portion and the relatively strong portion remains substantially undeformed. Thus the relatively strong portion prevents the sidewall itself from bowing out, meaning that the deformation of the soft portion sidewall can absorb energy along a substantial portion of the track of the lug in the slot, and meaning that the energy absorbed by deformation of the soft portion may be more predictable than in some prior designs.

FIGS. 4 to 8 illustrate a steering column assembly embodying the present invention.

A steering shaft 401 interconnects a steering wheel (not shown) to a steering mechanism such as a steering rack (not shown). The steering shaft comprises two elongate parts that are rotationally fast with each other about their axis. The two parts of the steering shaft can telescope together. To that end, one of the parts could be a splined sliding fit inside the other; or one part could be a tube inside which the other part fits, and one of the parts could have a keyway that runs axially and is engaged by a projecting key on the other part. At the forward end of the steering shaft there is a universal joint 402. When the structure shown in FIG. 4 is mounted in a vehicle the universal joint allows the steering shaft to swing about a horizontal axis that passes through the universal joint, whilst still transmitting rotation to the steering mechanism.

The steering shaft runs inside a locating tube 403. The locating tube holds the steering shaft in a set orientation as will be described in more detail below. A mechanism for fore and aft adjustment of the steering wheel (not shown) can be attached to the rearward end of the locating tube.

Figure 1:
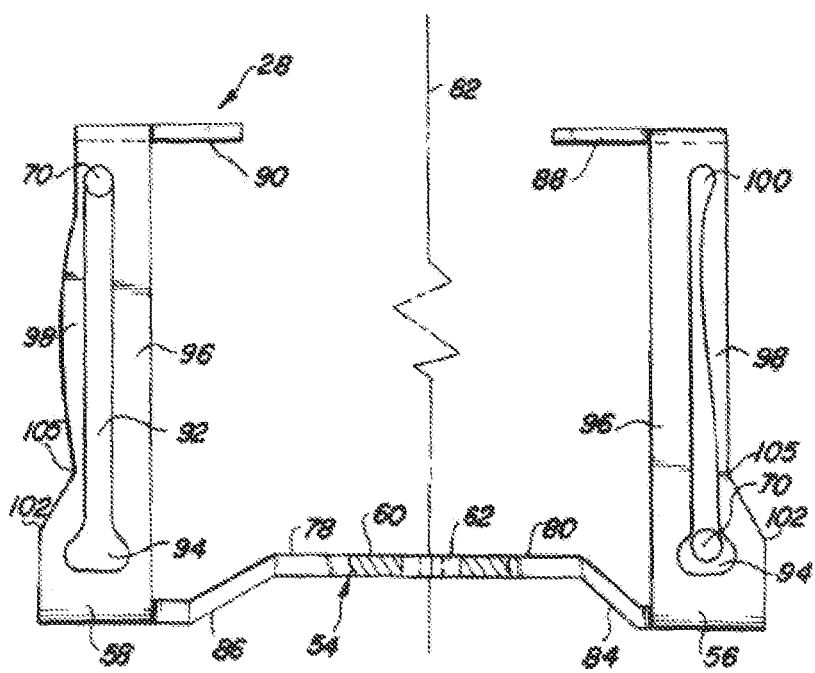
FIG. 1 is a plan view of a prior art steering column assembly mounting bracket before and after an impact.
Figure 2A:
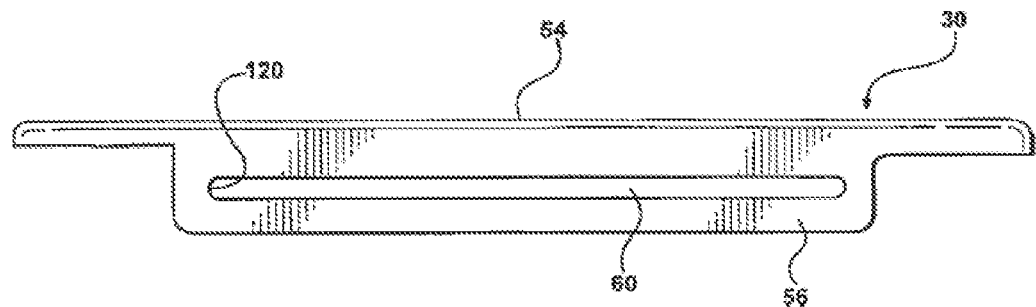
FIG. 2a is a side view of a prior art bracket of an adjustable steering column assembly.
Figure 2B:
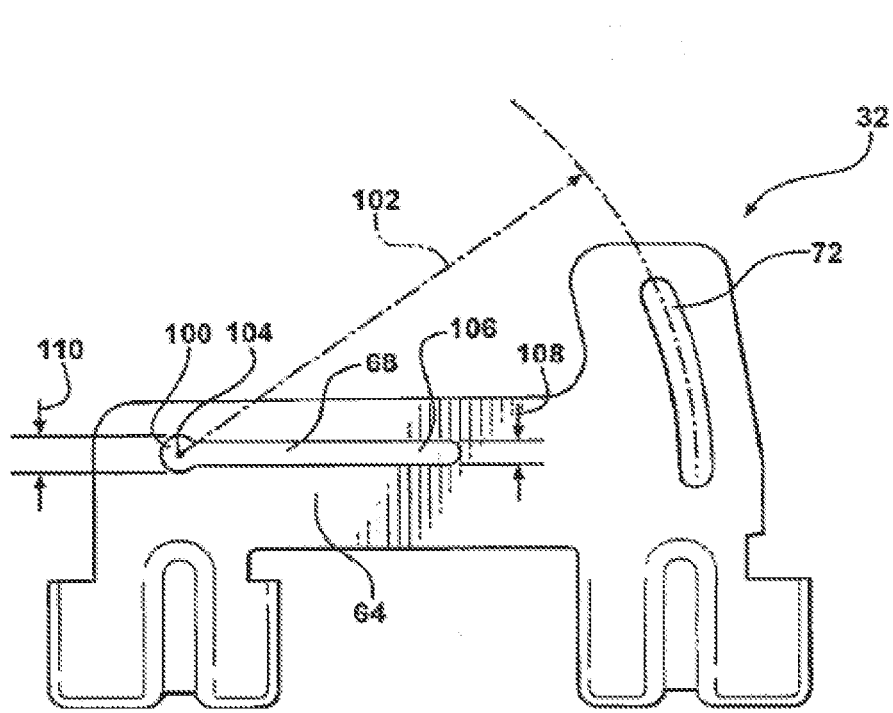
Figure 3:
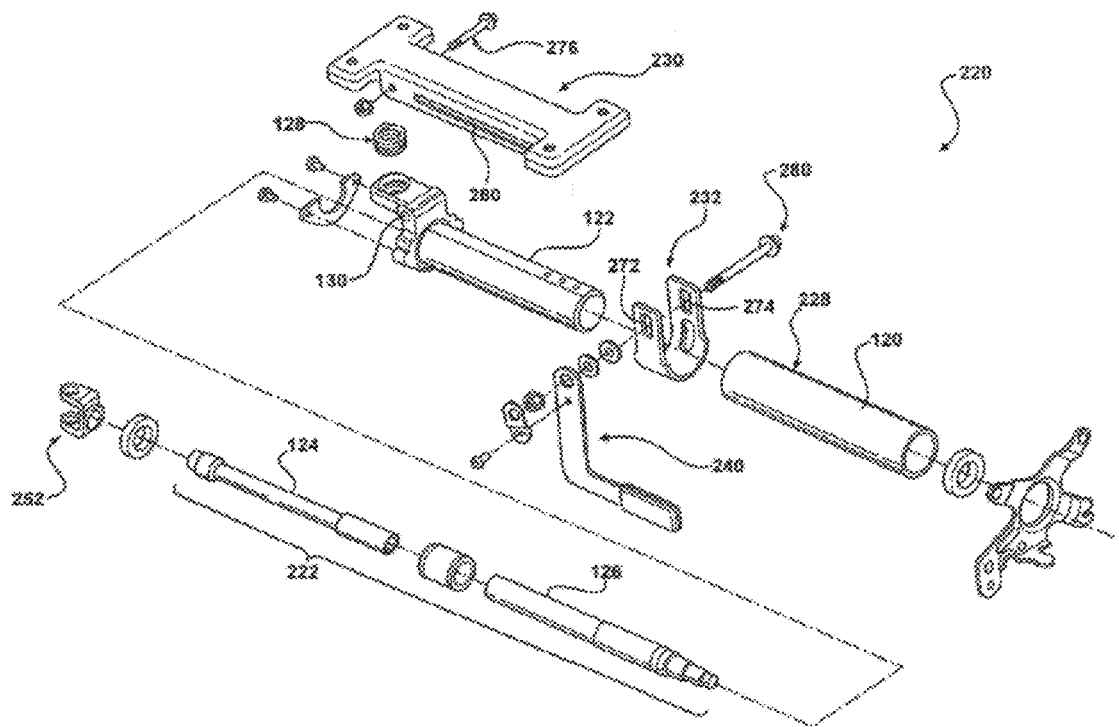
FIG. 3 is an exploded view of a prior art steering column assembly.
Figure 4:
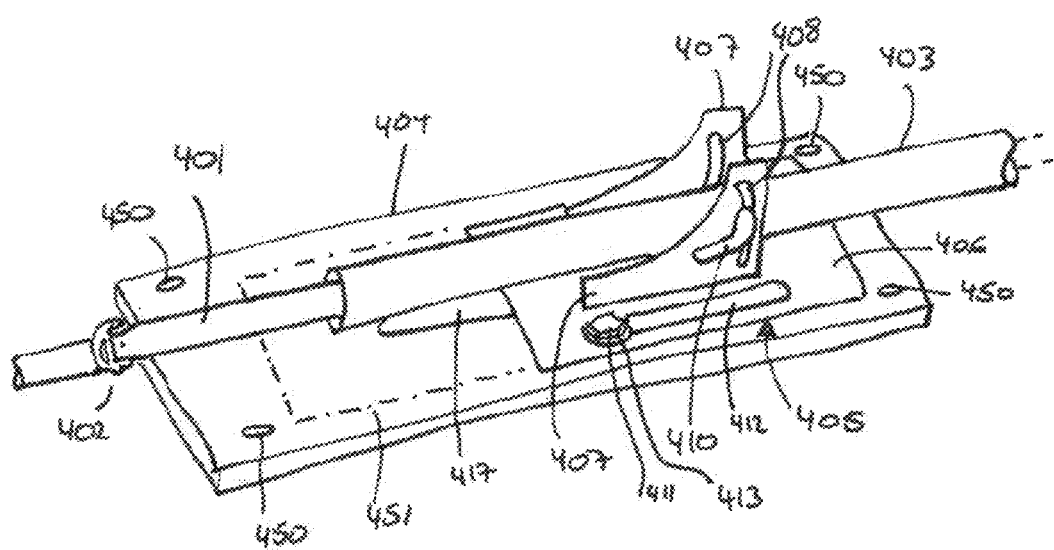
FIG. 4 is a view of a steering column assembly according to an embodiment of the present invention.
Figure 5:
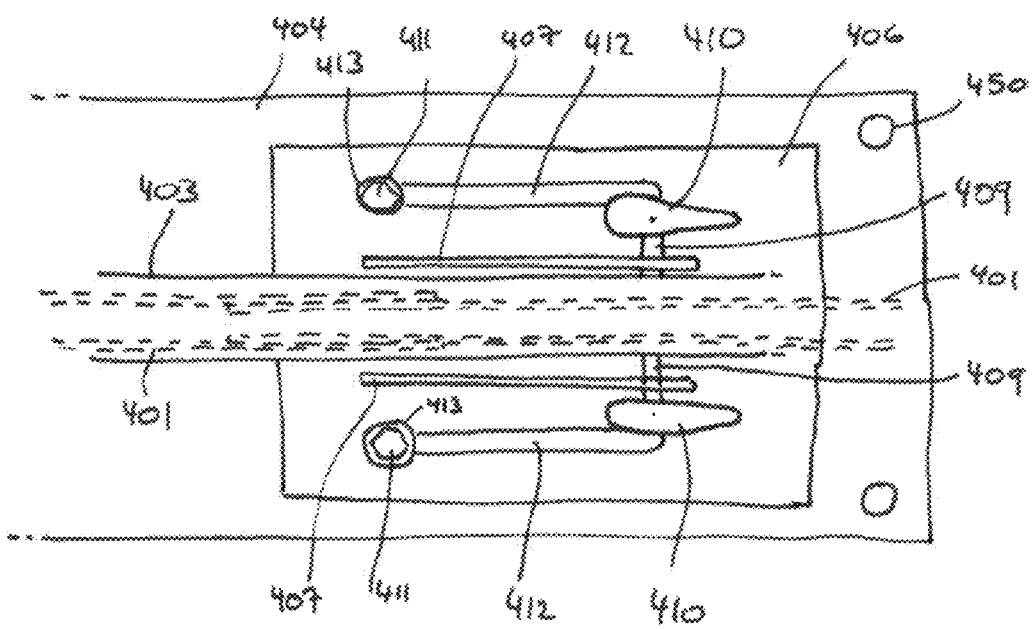
FIG. 5 is a plan view of a steering column assembly according to an embodiment of the present invention.

A mounting block 404 provides for the attachment of the structure shown in FIG. 4 to a vehicle. When the structure is in use the mounting block is firmly anchored to the body of the vehicle, for example to a bulkhead at the front of the passenger compartment, by means of bolts passing through holes 450. A carriage 405 is attached to the mounting plate. The carriage comprises a base plate 406 and two sidewalls 407 which extend perpendicularly from the base plate. The sidewalls define arcuate slots 408 which describe a radius about the centre of the universal joint 402. Pins 409 (see FIG. 5) extend horizontally from the locating tube 403 and through the slots 408. A clamp mechanism 410 can be operated to pull on at least one of the pins by bearing on the sidewall through which that pin runs, and thereby clamp the locating tube in a particular orientation relative to the carriage and hence to the vehicle. The clamp mechanism could be a cam attached to a lever which allows it to be operated by hand. When the clamp is released the locating tube is free to swing in the plane of the sidewalls about the centre of the universal joint. Since the steering shaft runs through the locating tube, this mechanism allows a driver to alter the rake of the steering shaft and then lock it in the desired orientation.

The base plate 406 of the carriage is flat and lies against a region of the mounting block 404 which is flat, whereby the base plate can slide against the mounting block. In FIG. 4 the carriage is shown in its initial position. After sliding relative to the mounting block it can adopt the position shown by chain dotted lines at 451. The base plate is located relative to the mounting block by bolts 411 which pass through holes in the mounting block and then through slots 412 in the base plate 406 of the carriage. The slots 412 run parallel with the steering shaft in the plane of the base plate. A nut is tightened on to each of the bolts to hold the base plate against the mounting block. A low-friction and/or compressible washer 413, for example of a plastics material such as nylon, is located between the head of the bolt and the base plate to avoid the bolt excessively restricting motion of the base plate relative to the mounting block.

The mounting block defines a third slot 417. The third slot is parallel with the first and second slots. The third slot lies along the projection of the steering shaft into the plane of the surface of the mounting block that faces the base plate 406. The third slot is located adjacent to the base plate. A stud 418 is rigidly attached to the base plate and extends into the slot. The stud is constituted by a bolt 419 which passes through a hole 420 in the base plate. A collar 421 surrounds the part of the bolt that projects into the slot and a nut 452 is tightened to the bolt to clench the collar to the base plate.

Figure 6:
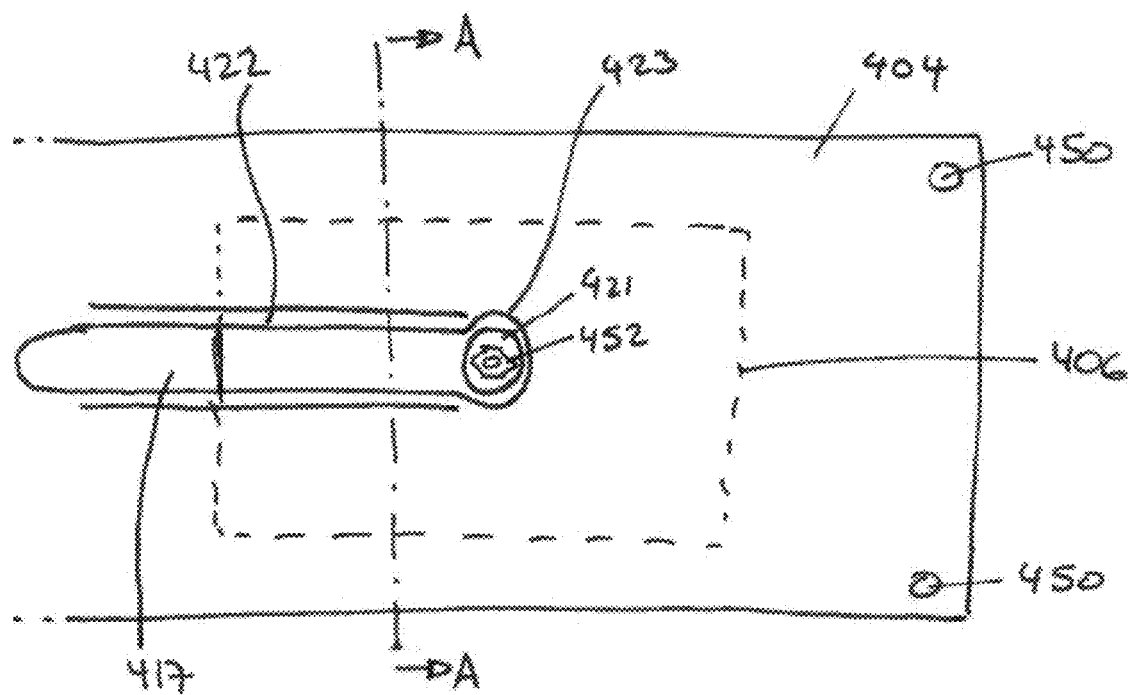
FIG. 6 is plan view of the underside of a steering column assembly according to an embodiment of the present invention.

The third slot 417 comprises a pocket 423 and a channel 422 (see FIG. 6). The pocket is sized to receive the collar 421 comfortably. The channel 422 is parallel-sided. The channel can be deformed, as will be described in more detail below, but in its undeformed condition the channel is narrower than the stud. More precisely, the width of the channel is less than the width of the part of the stud that would pass between the walls of the channel if the carriage were to slide relative to the mounting block by movement of bolts 411 along slots 412. In the example shown in the figures, due to the configuration of the slots 412 that sliding is a linear motion. Conveniently the exterior shape of the collar 421 is of constant cross-section in any plane perpendicular to the base plate. Most conveniently the exterior shape of collar 421 is a circular cylinder about an axis perpendicular to the base plate.

As will be described in more detail below, the mounting block is deformable in the region of the third slot 417 so that if sufficient force is applied the carriage can slide relative to the mounting block with the stud 418 ploughing through the channel 422, enlarging the width of the channel so that the stud can pass along it. The steering column of FIGS. 4 to 8 can be mounted in a vehicle. If that vehicle is involved in a collision, the driver may hit the steering wheel or an airbag connected to the steering wheel and push it forwards. The force applied by the driver's body can be passed via the locating tube 403 and the pins 409 to the rearward-facing walls of the arcuate slots 408. Since the mounting block is anchored to the vehicle, this force pushes the carriage 405 forwards relative to the mounting block. If the force is sufficient, the stud 418 will be moved from pocked 423 and forced to plough through the channel 422 causing plastic deformation of the walls of the channel. The plastic deformation of the channel absorbs energy, reducing the peak impact of the driver's body on the steering wheel and contributing to the driver's safety.

Figure 7:
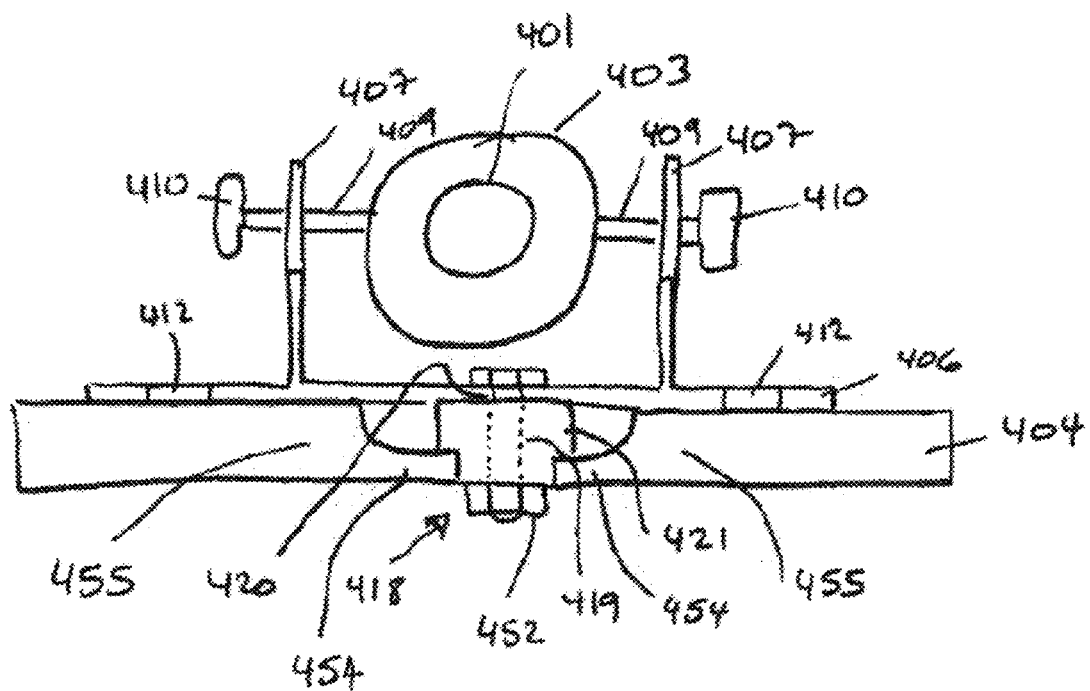
FIG. 7 is a cross-sectional view of a steering column assembly in a non-collapsed state according to an embodiment of the present invention.

With reference to FIG. 7, regions 455 of the mounting block run along the axis of the channel, i.e. along the axis along which the stud 418 moves relative to the mounting block when the assembly collapses. Regions 455 lie on either side of the channel. Between the channel and regions 455 are other regions 454. Regions 454 and 455 are configured such that when the stud moves through the channel regions 454 are plastically deformed in at least the regions through which the stud has moved during collapse of the steering column, and regions 455 are undeformed along their entire length. The stud is configured so that it too is undeformed after collapse.

FIG. 7 shows the mounting block in cross-section prior to deformation of the channel. In regions 454 adjacent to the channel 417 the mounting block is relatively thin. In regions 455 further from the channel the mounting block is relatively thick. The total width of the channel plus both regions 454 and 455 is greater than the width of the stud 418, as can be seen in FIG. 7. Due to the relative thickness of the mounting block in regions 454 and 455 the mounting block is more resistant to deformation in regions 455 than it is in regions 454. The thickness of the mounting block in regions 454 is selected to be sufficiently small compared to its thickness in regions 455 that when the stud ploughs through the channel, plastically deforming the material of the mounting block, that deformation will be restricted to regions 454, with regions 455 remaining substantially or entirely undeformed. This behaviour compels the stud to continue deforming region 454 throughout the whole of its travel along the channel, allowing energy to be absorbed progressively along the whole travel of the carriage and thus limiting the peak load on the driver. It also means that the energy expended in moving the stud through the channel can be predicted with reasonable accuracy by only considering the deformation of regions 454. This makes that prediction easier than in some prior designs.

Figure 8:
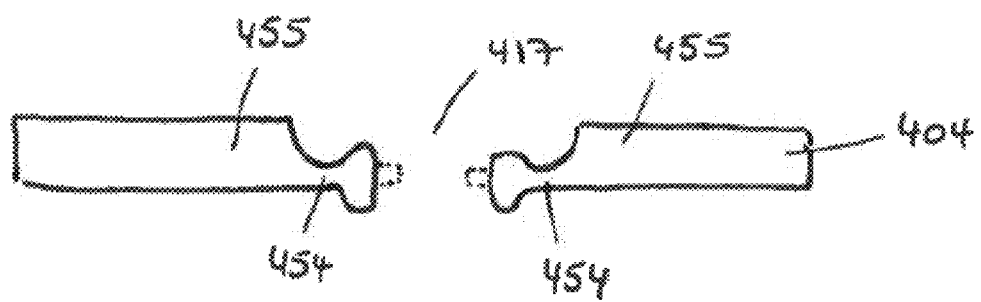
FIG. 8 is a cross-sectional view of the mounting block of FIG. 7 after collapse, with the shape of the mounting block before collapse indicated by dashed lines.

FIG. 8 shows the cross-section of a part of the mounting block after deformation. The regions 454 have been mushroomed by the passage of the stud between them.

The cross-sectional profile of the mounting block in the region of the channel could take any suitable form. There could be an abrupt change in thickness between regions 454 and 455. Alternatively, there could be a tapered or curved region between the two as shown in FIG. 8. Each region could have a constant thickness or its thickness could vary over its width. The strength of each region could be controlled by means other than altering the thickness of the mounting block. For example, the material of the regions 454 could be softer than the material of regions 455. Regions 455 could be defined by a separate component of softer material that is inserted into the remainder of the mounting block. Similarly, the mounting block could be reinforced by the attachment of a separate strengthening part at regions 455. Regions 454 could be integral with regions 455 but the regions could have been subjected to different chemical or mechanical treatment regimes: for example regions 455 could have been subjected to strengthening treatment to which regions 454 have not been subjected.

In designing the profile of the mounting block, the following steps could, as an example, be followed. Assume the mounting block is to be formed of a single piece of material and the weaker regions 454 are to be defined by milling material from the mounting block. The thickness of the stud is determined and then the dimensions of the weaker regions 454 are determined in order to give the desired energy absorption from plastic deformation of the regions by motion of the stud. Finally the thickness of the stronger regions 455 is determined so as to be sufficient to ensure that they will not deform during the anticipated deformation of the weaker regions. Alternatively the dimensions of the weaker regions 454 are first determined, the thickness of the stronger regions being determined so as to be sufficient to ensure that they will not deform during deformation of the weaker regions. The thickness of the stud would then be determined to give the desired energy absorption from plastic deformation of the weaker regions by motion of the stud.

The mounting plate could, for example, be cast into shape, with the relatively weaker regions machined out if necessary. The mounting plate could, for example be formed of an aluminium alloy. The carriage could, for example be formed of steel plate. The collar 421 of the stud is preferably formed of a relatively hard material such as a hardened steel alloy so that it does not deform when it ploughs through the channel 417.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A collapsible steering column assembly comprising a mounting structure, the mounting structure comprising a first part for connecting to the body of a vehicle and a second part for connecting to part of a steering mechanism, the first and second parts being interconnected to permit relative movement therebetween as the assembly collapses, wherein:
   one of the first or second parts comprises a slot, the slot comprising a pocket and a channel defined by two opposing sidewalls, each sidewall being the outer edge of a deformable structure;
   the other of the first or second parts comprises a lug, the lug extending into the pocket when the assembly is in a non-collapsed state and being configured to be driven through the channel to cause plastic deformation of the deformable structure as the assembly collapses; and
   the assembly comprises a re-enforcement that limits the plastic deformation of the deformable structure during the collapsing stroke to regions of the deformable structure adjacent to regions of the channel through which the lug has passed.

2. A steering column assembly as claimed in claim 1, the deformable structure comprises a relatively strong portion running longitudinally with the channel and a relatively weak portion running longitudinally with the channel and located between the relatively strong portion and the channel.

3. A steering column assembly as claimed in claim 2, wherein the relatively strong portion of the sidewall is thicker than the relatively weak portion of the sidewall when viewed in cross-section in a plane perpendicular to the longitudinal direction of the slot.

4. A steering column assembly as claimed in claim 2, wherein the relatively weak portion has a tapered profile when viewed in cross-section in a plane perpendicular to the longitudinal direction of the slot.

5. A steering column assembly as claimed in claim 2, wherein the relatively strong portion has a higher material hardness than the relatively weak portion.

6. A steering column assembly as claimed in claim 2, wherein the re-enforcement is the relatively strong portion.

7. A steering column assembly as claimed in claim 2, wherein the relatively strong portion is configured such that plastic deformation of the deformable structure is limited to the relatively weak portions.

8. A steering column assembly as claimed in claim 2, wherein the total width of the channel and the relatively weak portions is at least as great as the width of the lug.

9. A vehicle having a steering column assembly as claimed in any preceding claim, the said first part being connected to the body of the vehicle and the said second part being connected to part of a steering mechanism of the vehicle.

* * * * *